United States Patent
Liu

(10) Patent No.: US 11,910,334 B2
(45) Date of Patent: Feb. 20, 2024

(54) METHOD AND DEVICE FOR TRANSMITTING SYNCHRONIZATION INDICATION INFORMATION

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 447 days.

(21) Appl. No.: 17/212,412

(22) Filed: Mar. 25, 2021

(65) Prior Publication Data

US 2021/0212006 A1    Jul. 8, 2021

Related U.S. Application Data

(63) Continuation of application No. PCT/CN2018/108035, filed on Sep. 27, 2018.

(51) Int. Cl.
| | |
|---|---|
| H04W 56/00 | (2009.01) |
| H04L 1/1607 | (2023.01) |
| H04L 5/00 | (2006.01) |
| H04W 72/0446 | (2023.01) |
| H04W 72/30 | (2023.01) |

(52) U.S. Cl.
CPC ......... *H04W 56/001* (2013.01); *H04L 1/1642* (2013.01); *H04L 5/0051* (2013.01); *H04W 72/0446* (2013.01); *H04W 72/30* (2023.01)

(58) Field of Classification Search
CPC .. H04W 56/001; H04W 72/005; H04L 1/1642
See application file for complete search history.

(56) References Cited

U.S. PATENT DOCUMENTS

| | | | |
|---|---|---|---|
| 2019/0191457 A1* | 6/2019 | Si | H04L 5/0082 |
| 2019/0306832 A1* | 10/2019 | Si | H04J 11/0069 |
| 2019/0313345 A1* | 10/2019 | Jiang | H04W 56/001 |

(Continued)

FOREIGN PATENT DOCUMENTS

| | | |
|---|---|---|
| CN | 108235435 A | 6/2018 |
| CN | 108282842 A | 7/2018 |

(Continued)

OTHER PUBLICATIONS

Nokia, Nokia Shanghai Bell, "On indication of valid locations of SS/PBCH with RMSI", 3GPP TSG-RAN WG-1 meeting #92, R1-1802892, Athens, Greece, Feb. 26-Mar. 2, 2018.

(Continued)

*Primary Examiner* — Zhiren Qin
(74) *Attorney, Agent, or Firm* — Finnegan, Henderson, Farabow, Garrett & Dunner. L.L.P

(57) ABSTRACT

A method for transmitting synchronization indication information includes: determining, in alternative offset transmission positions, an actual offset transmission position of a synchronization signal and physical broadcast channel block (SSB) to be transmitted; generating actual sending position indication information according to the actual offset transmission position; and transmitting the SSB at the actual offset transmission position, and transmitting the actual sending position indication information through a physical broadcast channel (PBCH).

18 Claims, 7 Drawing Sheets

(56) References Cited

U.S. PATENT DOCUMENTS

| | | | | |
|---|---|---|---|---|
| 2020/0154376 A1* | 5/2020 | Ko | ...................... | H04W 72/30 |
| 2020/0162217 A1* | 5/2020 | Liu | .................. | H04W 56/0045 |
| 2020/0413357 A1* | 12/2020 | Tang | .................... | H04L 5/0082 |
| 2021/0007065 A1* | 1/2021 | Ko | ...................... | H04W 56/00 |

FOREIGN PATENT DOCUMENTS

| | | |
|---|---|---|
| CN | 108496321 A | 9/2018 |
| WO | WO 2018137466 A1 | 8/2018 |

OTHER PUBLICATIONS

ZTE Corporation, Sanechips, "Consideration on ReportCGI measurement", 3GPP TSG-RAN WG2 Meeting #101, R2-1802024, Athens, Greece, Feb. 26-Mar. 2, 2018.

OPPO, "Discussion on synchronization raster indication", 3GPP TSG RAN WG1 Meeting #92, R1-1802134, Athens, Greece, Feb. 26-Mar. 2, 2018.

Extended European Search Report in European Application No. 18935156.2, dated Apr. 12, 2022.

International Search Report in International Application No. PCT/CN2018/108035, dated Jun. 27, 2019.

Written Opinion of the International Search Authority in International Application No. PCT/CN2018/108035, dated Jun. 27, 2019.

Huawei, HiSilicon, "RMSI delivery", 3GPP TSG RAN WG1 Meeting #91, R1-1719372, Reno, USA, Nov. 27-Dec. 1, 2017, 9 pages.

Xiaomi, "Initial Access in NR unlicensed", 3GPP TSG RAN WG1 Meeting #94, R1-1809219, Gothenburg, Sweden, Aug. 20-24, 2018, 5 pages.

Xiaomi Communications, "SS/PBCH blocks transmission for NR unlicensed", 3GPP TSG RAN WG1 Meeting #93, R1-1807208, Busan, Korea, May 21-25, 2018, 2 pages.

\* cited by examiner

METHOD AND DEVICE FOR TRANSMITTING SYNCHRONIZATION INDICATION INFORMATION

CROSS REFERENCE TO RELATED APPLICATIONS

This application is a continuation application of International Application No. PCT/CN2018/108035, filed on Sep. 27, 2018, the content of which is incorporated herein by reference in its entirety.

TECHNICAL FIELD

The present disclosure relates to the technical field of communication, and particularly, to a method and device for transmitting synchronization indication information.

BACKGROUND

In related art, a project has recently been set up for research on unlicensed spectrums of 5th-Generation (5G) mobile communication system, and a solution supporting standalone networking of 5G unlicensed cells is proposed. For designing standalone networking of 5G unlicensed spectrums, design of synchronization signal and physical broadcast channel block (SS/PBCH Block, or SSB) is to be considered firstly.

SUMMARY

According to a first aspect of the embodiments of the present disclosure, a method for transmitting synchronization indication information includes: determining, in alternative offset transmission positions, an actual offset transmission position of an SSB to be transmitted; generating actual sending position indication information according to the actual offset transmission position; and transmitting the SSB at the actual offset transmission position, and transmitting the actual sending position indication information through a PBCH.

According to a second aspect of the embodiments of the present disclosure, a method for transmitting synchronization indication information includes: receiving an SSB, and actual sending position indication information transmitted through a PBCH; and performing synchronization processing according to the actual sending position indication information.

According to a third aspect of the embodiments of the present disclosure, a base station includes: a processor; and a memory configured to store instructions executable by the processor, wherein the processor is configured to: determine, in alternative offset transmission positions, an actual offset transmission position of an SSB to be transmitted; generate actual sending position indication information according to the actual offset transmission position; and transmit the SSB at the actual offset transmission position and transmit the actual sending position indication information through a PBCH.

According to a fourth aspect of the embodiments of the present disclosure, user equipment includes: a processor; and a memory configured to store instructions executable by the processor, wherein the processor is configured to: receive an SSB, and actual sending position indication information transmitted through a PBCH; and perform synchronization processing according to the actual sending position indication information.

It is to be understood that the above general description and detailed description below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In related art, a project has recently been set up for research on unlicensed spectrums of 5G mobile communication system, and a solution supporting standalone networking of 5G unlicensed cells is proposed. For designing standalone networking of 5G unlicensed spectrums, design about an SS/PBCH Block (SSB) is to be considered firstly. For an unlicensed spectrum, it may be necessary to follow a Listen Before Talk (LBT) principle. When an SSB needs to be transmitted, under the LBT principle, the SSB may not be transmitted at a fixedly configured position (normal transmission position) of a system because a time-frequency resource is occupied. If the time-frequency resource of the normal transmission position is not occupied, the SSB is transmitted at the normal transmission position.

In embodiments of the present disclosure, actual sending position indication information is used to notify user equipment (UE) of an actual offset transmission position and a specific SSB that is to be sent. If the time-frequency resource of the normal transmission position is occupied, the SSB may be sent at the offset transmission position allowed by the system, so that the UE timely synchronizes with a network side.

Figure 1:
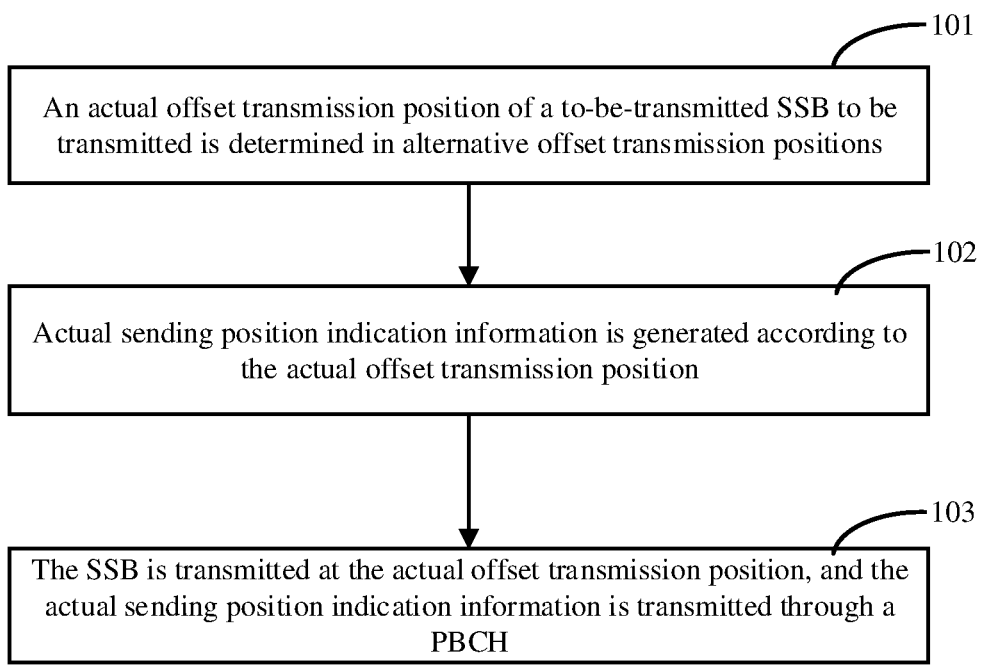
FIG. 1 is a flowchart of a method for transmitting synchronization indication information according to an exemplary embodiment.

FIG. 1 is a flowchart of a method for transmitting synchronization indication information according to an exemplary embodiment. The method for transmitting synchronization indication information is applied to an access network device, such as a base station. As shown in FIG. 1, the method includes the following operations 101 to 103.

In operation 101, an actual offset transmission position of an SSB to be transmitted is determined in alternative offset transmission positions.

In operation 102, actual sending position indication information is generated according to the actual offset transmission position.

In operation 103, the SSB is transmitted at the actual offset transmission position, and the actual sending position indication information is transmitted through a physical broadcast channel block (PBCH).

In the embodiment, a normal transmission position is configured for the SSB in a system, and the normal transmission position may be fixed. For example, slot 2 (S2) to slot 5 (S5) are used to transmit SSB0 to SSB3, taking four SSBs as an example. Positions for multiple SSBs may be continuous or discontinuous. In the embodiment, the positions are continuous, for example. All subsequent time-domain positions starting from slot 6 (S6) may be alternative offset transmission positions. The base station determines an SSB to be sent at first, for example, determining that SSB0 is to be sent, and detects whether a time-frequency resource on S2 corresponding to SSB0 is idle or not. If the time-frequency resource on S2 is idle, SSB0 is sent on S2. If the time-frequency resource on S2 is not idle, an actual offset transmission position of SSBO is determined in the alternative offset transmission positions, namely the actual offset transmission position is to be selected from S6 and subsequent slots. Then, it is detected whether a time-frequency resource on the actual offset transmission position is idle or not, and if the time-frequency resource at the actual offset transmission position is idle, SSBO is sent at the actual offset transmission position and actual sending position indication information is sent by the base station to UE through the PBCH.

The UE finds SSB0 and receives the actual sending position indication information. According to the actual sending position indication information, the UE knows that the received SSB is SSB0, a slot position of SSB0 found may also be known, and synchronization processing is further be completed.

According to the embodiment, more possible transmission positions are provided for the SSB, namely the alternative offset transmission positions are added on the basis of the normal transmission position, which provides more transmission opportunities for the SSB. In addition, actual sending position indication information is also added during alternative transmission, such that the UE can also recognize the SSB when finding the SSB at the alternative offset transmission position.

In an embodiment, when a possible offset transmission position of the SSB in the alternative offset transmission positions is configured to be fixed, the actual sending position indication information includes a slot block sequence number.

Figure 2:
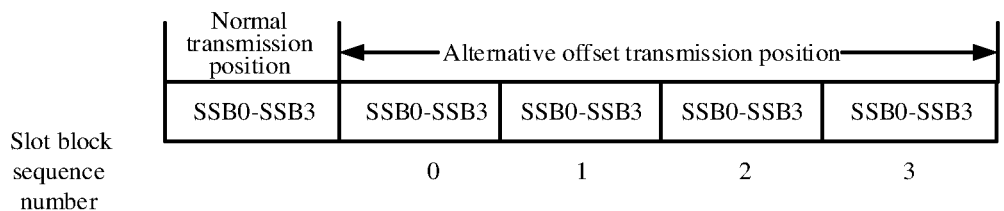
FIG. 2 is a schematic diagram illustrating a slot structure according to an exemplary embodiment.

In the embodiment, fixed positions are configured for each SSB during normal transmission and alternative transmission. As shown in FIG. 2, the maximum number L of SSBs in a transmission unit is specified in the system, and the number of SSBs that are actually transmitted may be less than or equal to L. In the embodiment, a time-domain length occupied by the number of L SSBs is called a slot block. For example, L=4, and slot positions of SSBs are continuous. For example, if SSB0 to SSB3 correspond to S2 to S5, then S2 to S5 form a slot block. Slot blocks may be continuous or discontinuous. In the embodiment, slot blocks at alternative offset transmission positions in a transmission unit are sequentially numbered to obtain slot block sequence numbers.

For example, L=4, a transmission unit may include five slot blocks, where the first slot block is a normal transmission position, and the last four slot blocks are alternative offset transmission positions. The last four slot blocks are sequentially numbered to obtain slot block sequence numbers 0 to 3 and occupy two bits. If one transmission unit is divided using multiple fixed time-domain units such as subframes or half frames, and the normal transmission position is not limited to the first slot block in the transmission unit and may also be another slot block, then the alternative offset transmission positions include fewer than four slot blocks, and two bits are still enough for representation. If the transmission unit starts from the normal transmission position, for example has a length of 5 ms, then the alternative offset transmission positions include four slot blocks, and two bits is still enough for representation.

Figure 3:
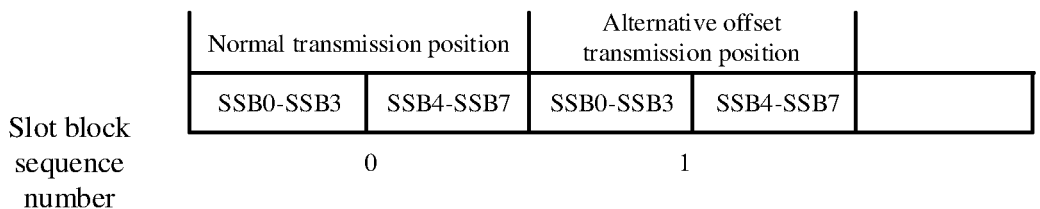
FIG. 3 is a schematic diagram illustrating a slot structure according to an exemplary embodiment.

As shown in FIG. 3, for example, L=8, a transmission unit has a length of 5 ms and includes two slot blocks, the first slot block (slot block 0) is a normal transmission position, and the second slot block (slot block 1) is an alternative offset transmission position. That is, there is only one alternative slot block sequence number, and two bits is still enough for representation.

In an embodiment, positions of respective SSBs in each slot block are fixed, and it is preset that the UE knows the fixed position of each SSB in the slot block. Therefore, when the slot block sequence number corresponding to the SSB for alternative transmission is notified to the UE, the UE can know which SSB it is and the position of the SSB.

In an embodiment, the slot block sequence number occupies two remaining information bits in the PBCH. In the embodiment, two bits is enough to represent the slot block sequence number, and thus the slot block sequence number is carried through the two remaining information bits in the PBCH.

In an embodiment, when the maximum number of SSBs in one transmission unit is 4 or 8, the slot block sequence number occupies two reserved bits A6 and A7 of an SSB sequence number in the PBCH.

In the related art, when L=4 or 8, A6 and A7 are two idle reserved bits. In the embodiment, a feasible solution is provided by transmitting the slot block sequence number through the two reserved bits.

In an embodiment, when the possible offset transmission position of the SSB in the alternative offset transmission positions is configured to be unfixed, the actual sending position indication information includes a sequence number of the SSB and a sequence number of the actual offset transmission position in the alternative offset transmission positions.

In the embodiment, any of the alternative offset transmission positions after the normal transmission position in a transmission unit may be used to transmit any SSB. That is, the possible offset transmission position of the SSB in the alternative offset transmission positions is configured to be unfixed. Under this condition, the sequence number of the SSB and the sequence number of the actual offset transmission position in the alternative offset transmission positions may be sent to the UE to notify the UE of an SSB to be sent and the position of the SSB.

In the embodiment, an indication manner is provided for the condition that the possible offset transmission position of the SSB in the alternative offset transmission positions is configured to be unfixed.

Figure 4:
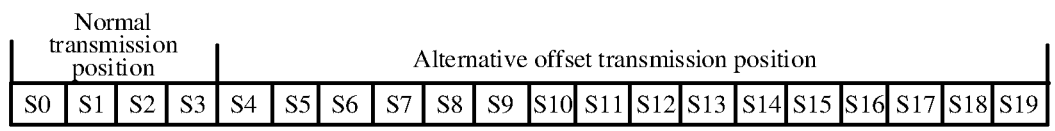
FIG. 4 is a schematic diagram illustrating a slot structure according to an exemplary embodiment.

In an embodiment, the sequence number of the actual offset transmission position in the alternative offset transmission positions is determined by jointly numbering a system transmission position and the alternative offset transmission positions. In the embodiment, the system transmission position is the normal transmission position. For example, if a transmission unit includes 20 slots and L=4, then slot sequence numbers in the transmission unit are from S0 to S19. S0 to S3 are normal transmission positions, and S4 to S19 are all alternative offset transmission positions, as shown in FIG. 4.

Figure 5:
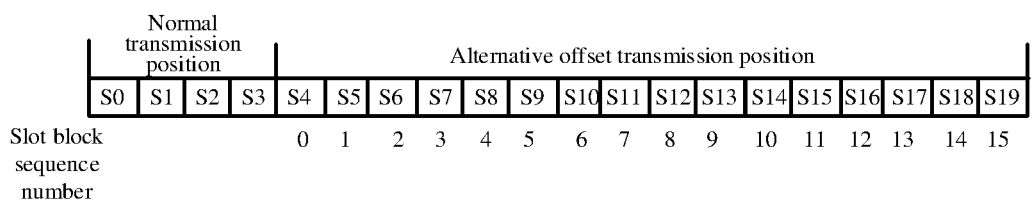
FIG. 5 is a schematic diagram illustrating a slot structure according to an exemplary embodiment.

In an embodiment, the sequence number of the actual offset transmission position in the alternative offset transmission positions is determined by sequentially numbering the alternative offset transmission positions. In the embodiment, the alternative offset transmission positions are independently numbered, as shown in FIG. 5, and sequence numbers of alternative offset transmission positions corresponding to S4 to S19 are 0 to 15. Indicating bits may be saved.

Figure 6:
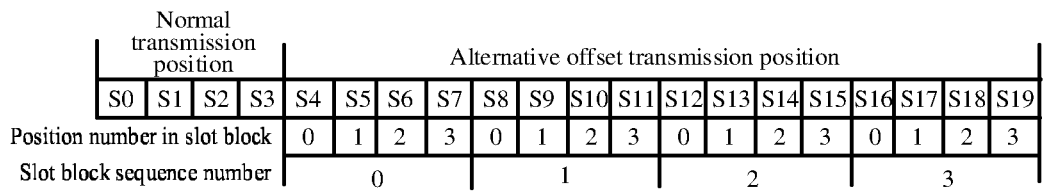
FIG. 6 is a schematic diagram illustrating a slot structure according to an exemplary embodiment.

In an embodiment, the sequence number of the actual offset transmission position in the alternative offset transmission positions includes the slot block sequence number and a position number in a slot block. As shown in FIG. 6, the alternative offset transmission position is represented in a manner of combining a slot block sequence number and a position number in a slot block in the embodiment. For example, during alternative transmission of the SSB on S4, the sequence number of the actual offset transmission position in the alternative offset transmission positions is 00, the first 0 representing the slot block sequence number and the last 0 representing the position number in the slot block. The indication manner in the embodiment is similar to the solutions shown in FIG. 2 and FIG. 3. However, any SSB may be transmitted at each position in the slot block, and the position of the SSB is unfixed.

In the embodiment, multiple numbering manners are provided. Accordingly, multiple indication manners are correspondingly provided, which can be applied to a variety of application scenarios. When the indication manners are adopted, few bits are occupied, and network resources occupied are saved as much as possible.

In an embodiment, the sequence number of the SSB and the sequence number of the actual offset transmission position in the alternative offset transmission positions occupies six remaining information bits that are provided by both the PBCH and a demodulation reference signal (DMRS) sequence. In the embodiment, the sequence number of the SSB and the sequence number of the actual offset transmission position in the alternative offset transmission positions occupying six bits may cover most conditions. Therefore, a feasible solution of occupying the remaining information bits, totally six bits, in the PBCH and the DMRS sequence is provided in the embodiment.

In an embodiment, the sequence number of the SSB and the sequence number of the actual offset transmission position in the alternative offset transmission positions occupy three reserved bits A5, A6 and A7 of the SSB sequence number in the PBCH and occupy lower three bits in the DMRS sequence. In the embodiment, since it is necessary to send the sequence number of the SSB and the sequence number of the actual offset transmission position in the alternative offset transmission positions to the UE, more indicating bits are required. In the embodiment, a feasible solution of adopting the three reserved bits A5, A6 and A7 and occupying the lower three bits in the DMRS sequence, totally six bits, is provided.

In the embodiment shown in FIG. 4, for example, L=4, one transmission unit includes 20 slots, the sequence number of the SSB occupies two bits, and the sequence numbers 4 to 19 of the alternative offset transmission positions need to occupy five bits. However, in the embodiment, four bits are provided for the sequence numbers of the alternative offset transmission positions, and thus, some slot positions may need to be discarded, for example, the four slot positions S16 to S19 are discarded.

For example, L=8, the sequence number of the SSB occupies three bits, and even though the alternative offset transmission positions are independently numbered, the sequence numbers (0 to 11) of the alternative offset transmission positions needs to occupy four bits. However, in the embodiment, three bits are provided for the sequence numbers of the alternative offset transmission positions, and thus some slot positions may need to be discarded.

In an embodiment, the sequence number of the SSB and the sequence number of the actual offset transmission position in the alternative offset transmission positions also occupy two reserved bits in remaining minimum system information (RMSI), or two reserved bits in the SSB transmitted in a frequency division multiplexing mode, referred to herein as the SSB-FDM. In the embodiment, two bits are further added. The two reserved bits in the RMSI or the two reserved bits in the SSB-FDM may be adopted so that more indicating bits are provided for the alternative offset transmission positions, which is equivalent to that more alternative offset transmission positions are provided.

In an embodiment, when the two reserved bits in the RMSI or the two reserved bits in the SSB-FDM are not occupied by the sequence number of the actual offset transmission position in the alternative offset transmission positions, values of the two reserved bits in the RMSI or the two reserved bits in the SSB-FDM are preset invalid values.

As described above, in the embodiment shown in FIG. 5, the sequence number of the SSB and the sequence number of the actual offset transmission position in the alternative offset transmission positions may be indicated using six bits. In such case, the two reserved bits in the RMSI or the two reserved bits in the SSB-FDM are idle and may be configured to be invalid values such as 11 to represent that the bits are idle and not adopted.

In the embodiment shown in FIG. 4, eight bits are required to indicate the sequence number of the SSB and the sequence number of the actual offset transmission position in the alternative offset transmission positions. In such case, corresponding valid values such as other values except 11 may be adopted for the two reserved bits in the RMSI or the two reserved bits in the SSB-FDM.

In an embodiment, when the maximum number of SSBs in a transmission unit is 4, the sequence number of the SSB occupies two reserved bits in the three reserved bits A5, A6 and A7 of the SSB sequence number in the PBCH, and the sequence number of the actual offset transmission position in the alternative offset transmission positions occupies the remaining one reserved bit in A5, A6 and A7 and the lower three bits in the DMRS sequence.

When the maximum number of SSBs in a transmission unit is 8, the sequence number of the SSB occupies the three reserved bits A5, A6 and A7 of the SSB sequence number Attorney Docket No. 13269.0161 in the PBCH, and the sequence number of the actual offset transmission position in the alternative offset transmission positions occupies the lower three bits in the DMRS sequence, or also occupies the two reserved bits in the RMSI or the two reserved bits in the SSB-FDM.

In the embodiment, the sequence number of the SSB and a specific position of the sequence number of the actual offset transmission position in the alternative offset transmission positions are provided.

In an embodiment, the actual sending position indication information occupies eight bits. In the embodiment, the actual sending position indication information occupies eight bits under various conditions, which is compatible with the embodiments as described above.

Figure 7:
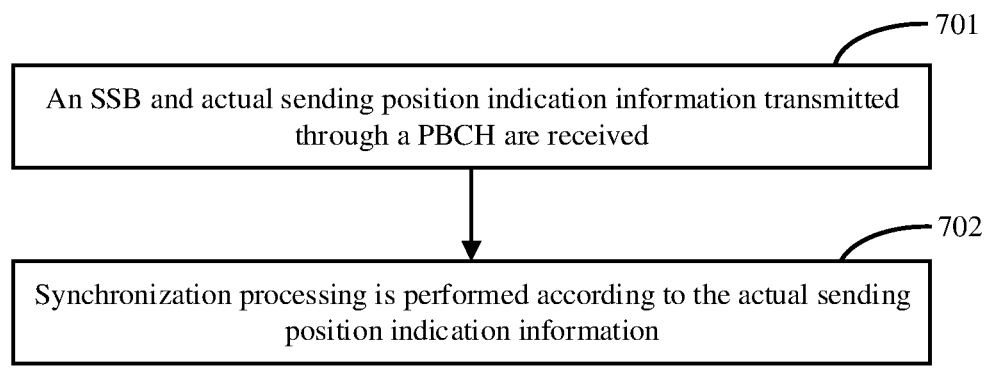
FIG. 7 is a flowchart of a method for transmitting synchronization indication information according to an exemplary embodiment.

FIG. 7 is a flowchart of a method for transmitting synchronization indication information according to an exemplary embodiment. The method for transmitting synchronization indication information is applied to UE. The UE may be a mobile phone, a computer, a digital broadcast terminal, a messaging device, a gaming console, a tablet, a medical device, exercise equipment, a personal digital assistant and the like. As shown in FIG. 7, the method includes the following operations 701 to 702.

In operation 701, an SSB and actual sending position indication information transmitted through a PBCH are received by the UE.

In operation 702, synchronization processing is performed by the UE according to the actual sending position indication information.

In the embodiment, the UE can receive the SSB and the corresponding actual sending position indication information, and learn about the specific SSB that is received and a position of the SSB by parsing the actual sending position indication information, and thus to implement synchronization processing.

Multiple manners for indicating the actual sending position indication information are provided above on the base station side, and corresponding parsing manners may be configured on the UE side, which will not repeated herein.

The above embodiments may be flexibly combined according to a practical requirement.

Figure 8:
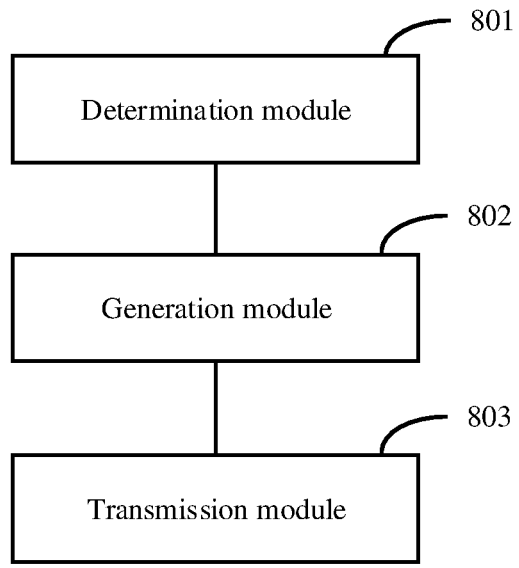
FIG. 8 is a block diagram of a device for transmitting synchronization indication information according to an exemplary embodiment.

FIG. 8 is a block diagram of a device for transmitting synchronization indication information according to an exemplary embodiment. Each module in the device may be Attorney Docket No. 13269.0161 implemented through software, or hardware, or a combination thereof. The device for transmitting synchronization indication information is applied to a base station and includes a determination module 801, a generation module 802, and a transmission module 803.

The determination module 801 is configured to determine an actual offset transmission position of a to-be-transmitted SSB in alternative offset transmission positions.

The generation module 802 is configured to generate actual sending position indication information according to the actual offset transmission position.

The transmission module 803 is configured to transmit the SSB at the actual offset transmission position and transmit the actual sending position indication information through a PBCH.

In an embodiment, when a possible offset transmission position of the SSB in the alternative offset transmission positions is configured to be fixed, the actual sending position indication information includes a slot block sequence number.

In an embodiment, the slot block sequence number occupies two remaining information bits in the PBCH.

In an embodiment, when the maximum number of SSBs in a transmission unit is 4 or 8, the slot block sequence number occupies two reserved bits A6 and A7 of an SSB sequence number in the PBCH.

In an embodiment, when the possible offset transmission position of the SSB in the alternative offset transmission positions is configured to be unfixed, the actual sending position indication information includes a sequence number of the SSB and a sequence number of the actual offset transmission position in the alternative offset transmission positions.

In an embodiment, the sequence number of the actual offset transmission position in the alternative offset transmission positions is determined by jointly numbering a system transmission position and the alternative offset transmission positions.

In an embodiment, the sequence number of the actual offset transmission position in the alternative offset transmission positions is determined by sequentially numbering the alternative offset transmission positions.

In an embodiment, the sequence number of the actual offset transmission position in the alternative offset transmission positions includes the slot block sequence number and a position number in a slot block.

In an embodiment, the sequence number of the SSB and the sequence number of the actual offset transmission position in the alternative offset transmission positions occupy six remaining information bits provided by both the PBCH and a DMRS sequence.

In an embodiment, the sequence number of the SSB and the sequence number of the actual offset transmission position in the alternative offset transmission positions occupy three reserved bits A5, A6 and A7 of the SSB sequence number in the PBCH and occupy lower three bits in the DMRS sequence.

In an embodiment, the sequence number of the SSB and the sequence number of the actual offset transmission position in the alternative offset transmission positions also occupy two reserved bits in RMSI or two reserved bits in SSB-FDM.

In an embodiment, when the two reserved bits in the RMSI or the two reserved bits in the SSB-FDM are not occupied by the sequence number of the actual offset transmission position in the alternative offset transmission positions, values of the two reserved bits in the RMSI or the two reserved bits in SSB-FDM are preset invalid values.

In an embodiment, when the maximum number of SSBs in a transmission unit is 4, the sequence number of the SSB occupies two reserved bits in the three reserved bits A5, A6 and A7 of the SSB sequence number in the PBCH, and the sequence number of the actual offset transmission position in the alternative offset transmission positions may occupies the remaining reserved bit in A5, A6 and A7 and the lower three bits in the DMRS sequence.

In an embodiment, when the maximum number of SSBs in a transmission unit is 8, the sequence number of the SSB occupies the three reserved bits A5, A6 and A7 of the SSB sequence number in the PBCH, and the sequence number of the actual offset transmission position in the alternative offset transmission positions occupies the lower three bits in the DMRS sequence, or also occupies the two reserved bits in the RMSI or the two reserved bits in the SSB-FDM.

In an embodiment, the actual sending position indication information occupies eight bits.

Figure 9:
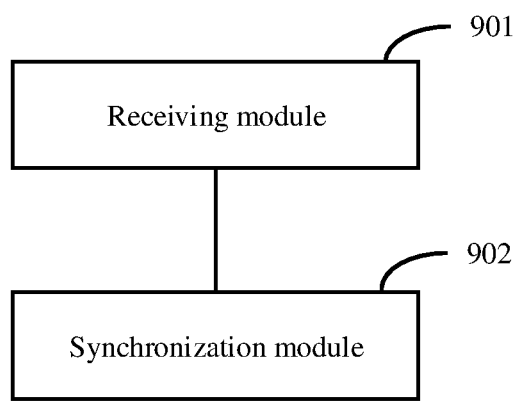
FIG. 9 is a block diagram of a device for transmitting synchronization indication information according to an exemplary embodiment.

FIG. 9 is a block diagram of a device for transmitting synchronization indication information according to an exemplary embodiment. Each module in the device may be implemented through software, hardware, or a combination thereof. The device for transmitting synchronization indication information is applied to a UE, and includes a receiving module 901 and a synchronization module 902.

The receiving module 901 is configured to receive an SSB and actual sending position indication information that is transmitted through a PBCH.

The synchronization module 902 is configured to perform synchronization processing according to the actual sending position indication information.

For the device in the above embodiments, the specific manner for the operations executed by various modules have been described in detail in the embodiments related to the method, and is not repeated herein.

Figure 10:
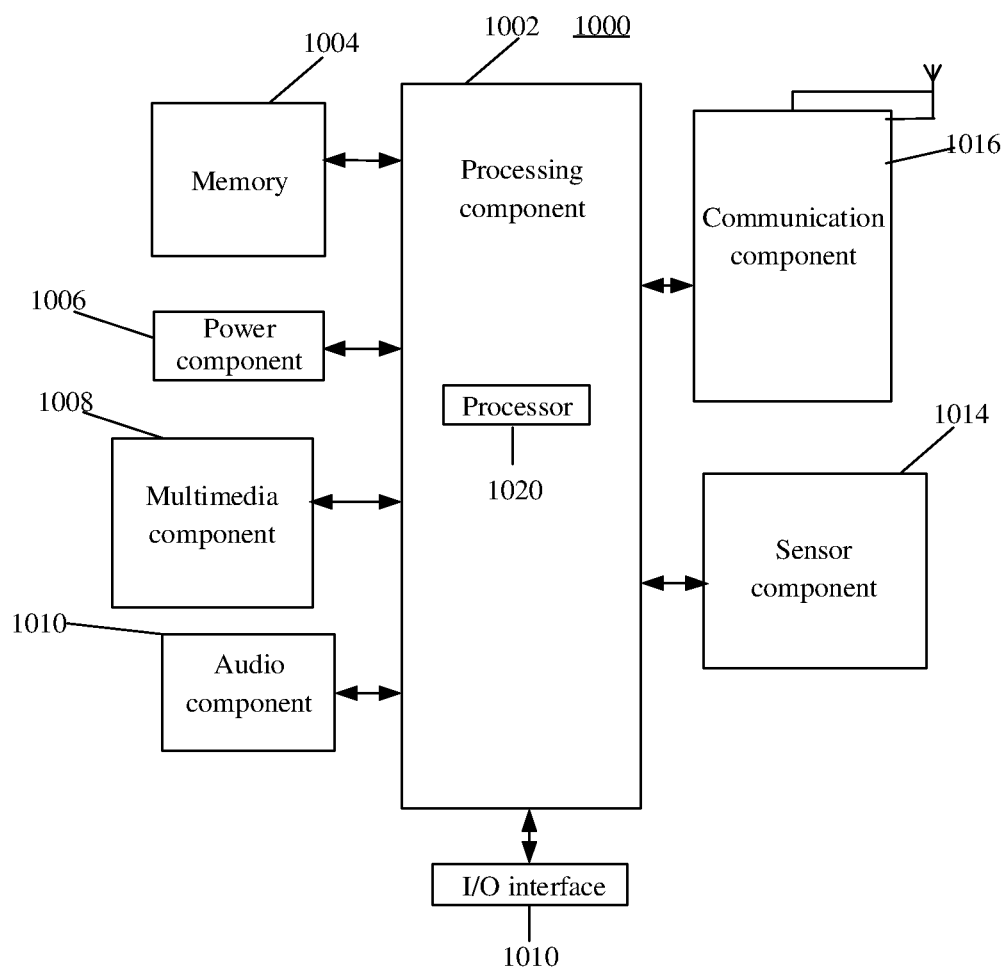
FIG. 10 is a block diagram of a device for transmitting synchronization indication information according to an exemplary embodiment.

FIG. 10 is a block diagram of a device for transmitting synchronization indication information according to an exemplary embodiment. For example, the device 1000 may be UE, such as a mobile phone, a computer, a digital broadcast terminal, a messaging device, a gaming console, a tablet, a medical device, exercise equipment, a personal digital assistant and the like.

The device 1000 may include one or more of the following components: a processing component 1002, a memory 1004, a power component 1006, a multimedia component 1008, an audio component 1010, an Input/Output (I/O) interface 1012, a sensor component 1014, and a communication component 1016.

The processing component 1002 typically controls overall operations of the device 1000, such as the operations associated with display, telephone calls, data communications, camera operations, and recording operations. The processing component 1002 may include one or more processors 1020 to execute instructions to perform all or part of the steps in the abovementioned method. Moreover, the processing component 1002 may include one or more modules which facilitate interaction between the processing component 1002 and the other components. For instance, the processing component 1002 may include a multimedia module to facilitate interaction between the multimedia component 1008 and the processing component 1002.

The memory 1004 is configured to store various types of data to support the operation of the device 1000. Examples of such data include instructions for any applications or methods operated on the device 1000, contact data, phonebook data, messages, pictures, video, etc. The memory 1004 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1006 provides power for various components of the device 1000. The power component 1006 may include a power management system, one or more power supplies, and other components associated with generation, management and distribution of power for the device 1000.

The multimedia component 1008 includes a screen providing an output interface between the device 1000 and a user. In some embodiments, the screen may include a Liquid Crystal Display (LCD) and a Touch Panel (TP). If the screen includes the TP, the screen may be implemented as a touch screen to receive an input signal from the user. The touch panel includes one or more touch sensors to sense touches, swipes and gestures on the touch panel. The touch sensors may not only sense a boundary of a touch or swipe action but also detect a duration and pressure associated with the touch or swipe action. In some embodiments, the multimedia component 1008 includes a front camera and/or a rear camera. The front camera and/or the rear camera may receive external multimedia data when the device 1000 is in an operation mode, such as a photographing mode or a video mode. Each of the front camera and the rear camera may be a fixed optical lens system or have focusing and optical zooming capabilities.

The audio component 1010 is configured to output and/or input an audio signal. For example, the audio component 1010 includes a Microphone (MIC), and the MIC is configured to receive an external audio signal when the device 1000 is in the operation mode, such as a call mode, a recording mode and a voice recognition mode. The received audio signal may further be stored in the memory 1004 or sent through the communication component 1016. In some embodiments, the audio component 1010 further includes a speaker configured to output the audio signal.

Attorney Docket No. 13269.0161

The I/O interface 1012 provides an interface between the processing component 1002 and a peripheral interface module, and the peripheral interface module may be a keyboard, a click wheel, a button and the like. The button may include, but not limited to: a home button, a volume button, a starting button and a locking button.

The sensor component 1014 includes one or more sensors configured to provide status assessment in various aspects for the device 1000. For instance, the sensor component 1014 may detect an on/off status of the device 1000 and relative positioning of components, such as a display and small keyboard of the device 1000, and the sensor component 1014 may further detect a change in a position of the device 1000 or a component of the device 1000, presence or absence of contact between the user and the device 1000, orientation or acceleration/deceleration of the device 1000 and a change in temperature of the device 1000. The sensor component 1014 may include a proximity sensor configured to detect presence of an object nearby without any physical contact. The sensor component 1014 may also include a light sensor, such as a Complementary Metal Oxide Semiconductor (CMOS) or Charge Coupled Device (CCD) image sensor, configured for use in an imaging application. In some embodiments, the sensor component 1014 may also include an acceleration sensor, a gyroscope sensor, a magnetic sensor, a pressure sensor or a temperature sensor.

The communication component 1016 is configured to facilitate wired or wireless communication between the device 1000 and another device. The device 1000 may access a communication-standard-based wireless network, such as a Wireless Fidelity (WiFi) network, a 4th-Generation (4G) or 5th-Generation (5G) network or a combination thereof. In an exemplary embodiment, the communication component 1016 receives a broadcast signal or broadcast associated information from an external broadcast management system through a broadcast channel. In an exemplary embodiment, the communication component 1016 further includes a Near Field Communication (NFC) module to facilitate short-range communication. In an exemplary embodiment, the communication component 1016 may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the device 1000 may be implemented by one or

Attorney Docket No. 13269.0161 more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 1004 including an instruction, and the instruction may be executed by the processor 1020 of the device 1000 to perform the above methods. For example, the non-transitory computer-readable storage medium may be a ROM, a Random Access Memory (RAM), a Compact Disc Read-Only Memory (CD-ROM), a magnetic tape, a floppy disc, an optical data storage device and the like.

In an exemplary embodiment, a device for transmitting synchronization indication information includes: a processor; and a memory configured to store instructions executable by the processor, wherein the processor is configured to: receive an SSB and actual sending position indication information that is transmitted through a PBCH; and perform synchronization processing according to the actual sending position indication information.

Figure 11:
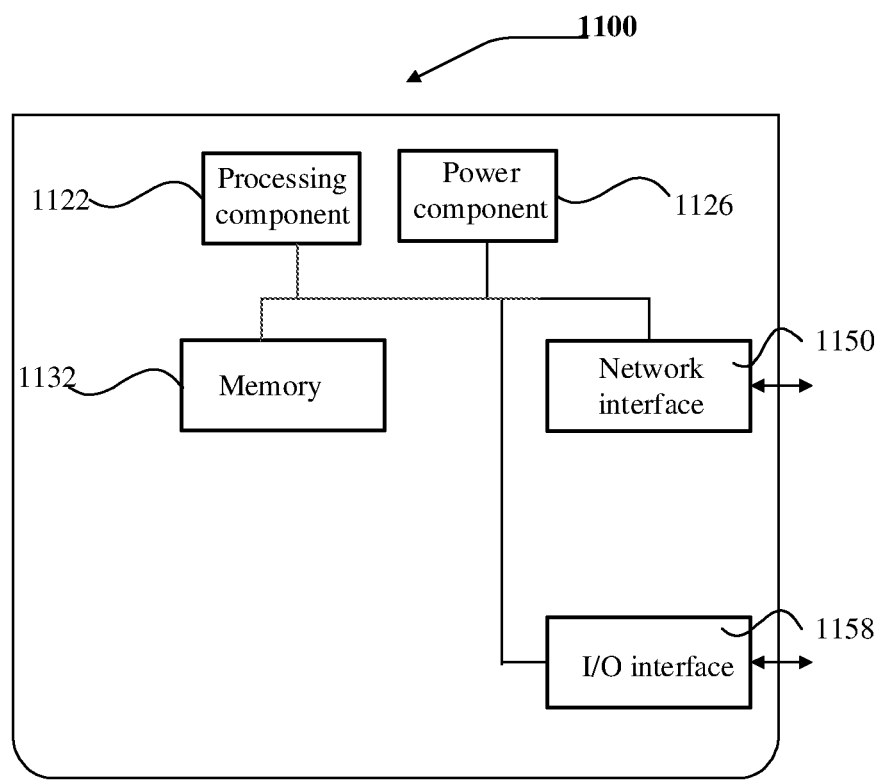
FIG. 11 is a block diagram of a device for transmitting synchronization indication information according to an exemplary embodiment.

FIG. 11 is a block diagram of a device 1100 for data synchronization according to an exemplary embodiment. For example, the device 1100 may be provided as an access network device, such as a base station. Referring to FIG. 11, the device 1100 includes a processing component 1122 which further including one or more processors, and a memory resource represented by a memory 1132, configured to store instructions executable by the processing component 1122, for example, an application program. The application program stored in the memory 1132 may include one or more than one module of which each corresponds to a set of instructions. In addition, the processing component 1122 is configured to execute the instructions to perform the methods described above.

The device 1100 may further include a power component 1126 configured to execute power management of the device 1100, a wired or wireless network interface 1150 configured to connect the device 1100 to a network and an I/O interface 1158. The device 1100 may be operated based on an operating system stored in the memory 1132, for example, Windows Server™, Mac OS X™, Unix™, Linux™, FreeBSD™ or the like.

In an exemplary embodiment, a device for transmitting synchronization indication information includes: a processor; and a memory configured to store instructions executable by the processor, wherein the processor is configured to: determine an actual offset transmission position of a to-be-transmitted SSB in alternative offset transmission positions; generate actual sending position indication information according to the actual offset transmission position; and transmit the SSB at the actual offset transmission position and transmit the actual sending position indication information through a PBCH.

In exemplary embodiments, the processor may be further configured to implement the following.

In an embodiment, when a possible offset transmission position of the SSB in the alternative offset transmission positions is configured to be fixed, the actual sending position indication information includes a slot block sequence number.

In an embodiment, the slot block sequence number occupies two remaining information bits in the PBCH.

In an embodiment, when the maximum number of SSBs in a transmission unit is 4 or 8, the slot block sequence number occupies two reserved bits A6 and A7 of an SSB sequence number in the PBCH.

In an embodiment, when the possible offset transmission position of the SSB in the alternative offset transmission positions is configured to be unfixed, the actual sending position indication information includes a sequence number of the SSB and a sequence number of the actual offset transmission position in the alternative offset transmission positions.

In an embodiment, the sequence number of the actual offset transmission position in the alternative offset transmission positions is determined by jointly numbering a system transmission position and the alternative offset transmission positions.

In an embodiment, the sequence number of the actual offset transmission position in the alternative offset transmission positions is determined by sequentially numbering the alternative offset transmission positions.

In an embodiment, the sequence number of the actual offset transmission position in the alternative offset transmission positions includes the slot block sequence number and a position number in a slot block.

In an embodiment, the sequence number of the SSB and the sequence number of the actual offset transmission position in the alternative offset transmission positions occupy six remaining information bits provided by both the PBCH and a DMRS sequence.

In an embodiment, the sequence number of the SSB and the sequence number of the actual offset transmission position in the alternative offset transmission positions occupy three reserved bits A5, A6 and A7 of the SSB sequence number in the PBCH and occupy lower three bits in the DMRS sequence.

In an embodiment, the sequence number of the SSB and the sequence number of the actual offset transmission position in the alternative offset transmission positions also occupy two reserved bits in RMSI or two reserved bits in SSB-FDM.

In an embodiment, when the two reserved bits in the RMSI or the two reserved bits in SSB-FDM are not occupied by the sequence number of the actual offset transmission position in the alternative offset transmission positions, values of the two reserved bits in the RMSI or the two reserved bits in the SSB-FDM are preset invalid values.

In an embodiment, when the maximum number of SSBs in a transmission unit is 4, the sequence number of the SSB occupies two reserved bits in the three reserved bits A5, A6 and A7 of the SSB sequence number in the PBCH, and the sequence number of the actual offset transmission position in the alternative offset transmission positions occupies the remaining reserved bit in A5, A6 and A7 and the lower three bits in the DMRS sequence.

In an embodiment, when the maximum number of SSBs in a transmission unit is 8, the sequence number of the SSB occupies the three reserved bits A5, A6 and A7 of the SSB sequence number in the PBCH, and the sequence number of the actual offset transmission position in the alternative offset transmission positions occupies the lower three bits in the DMRS sequence, or also occupies the two reserved bits in the RMSI or the two reserved bits in the SSB-FDM.

In an embodiment, the actual sending position indication information occupies eight bits.

In an exemplary embodiment, there is also provided a non-transitory computer-readable storage medium including an instruction, such as the memory 1132 including an instruction, and the instruction may be executed by the processor 1122 of the device 1100 to perform the above methods. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Other implementations of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for transmitting synchronization indication information, the method being applied to a base station and comprising:
    determining, in alternative offset transmission positions, an actual offset transmission position of a synchronization signal and physical broadcast channel block (SSB) to be transmitted;
    generating actual sending position indication information according to the actual offset transmission position; and
    transmitting the SSB at the actual offset transmission position, and transmitting the actual sending position indication information through a physical broadcast channel (PBCH),
    wherein, when a first offset transmission position of the SSB in the alternative offset transmission positions is configured to be unfixed, the actual sending position indication information comprises a sequence number of the SSB and a sequence number of the actual offset transmission position in the alternative offset transmission positions.

2. The method of claim 1, wherein, when the first offset transmission position of the SSB in the alternative offset transmission positions is configured to be fixed, the actual sending position indication information comprises a slot block sequence number.

3. The method of claim 2, wherein the slot block sequence number occupies two remaining information bits in the PBCH.

4. The method of claim 3, wherein, when a maximum number of SSBs in a transmission unit is 4 or 8, the slot block sequence number occupies two reserved bits A6 and A7 of an SSB sequence number in the PBCH.

5. The method of claim 1, wherein the sequence number of the actual offset transmission position in the alternative offset transmission positions is determined by one of:
    jointly numbering a system transmission position and the alternative offset transmission positions;
    sequentially numbering the alternative offset transmission positions; or
    including, in the sequence number of the actual offset transmission position, a slot block sequence number and a position number in a slot block.

6. The method of claim 1, wherein the sequence number of the SSB and the sequence number of the actual offset transmission position in the alternative offset transmission positions occupy six remaining information bits that are provided by a PBCH and a demodulation reference signal (DMRS) sequence.

7. The method of claim 6, wherein the sequence number of the SSB and the sequence number of the actual offset transmission position in the alternative offset transmission positions occupy three reserved bits A5, A6 and A7 of the SSB sequence number in the PBCH and occupy lower three bits in the DMRS sequence.

8. The method of claim 7, wherein the sequence number of the SSB and the sequence number of the actual offset transmission position in the alternative offset transmission positions further occupy two reserved bits in remaining minimum system information (RMSI) or two reserved bits in the SSB transmitted in a frequency division multiplexing mode (SSB-FDM).

9. The method of claim 8, wherein, when the two reserved bits in the RMSI or the two reserved bits in the SSB-FDM are not occupied by the sequence number of the actual offset transmission position in the alternative offset transmission positions, values of the two reserved bits in the RMSI or the two reserved bits in the SSB-FDM are preset invalid values.

10. The method of claim 7, wherein, when a maximum number of SSBs in a transmission unit is 4, the sequence number of the SSB occupies two reserved bits in the three reserved bits A5, A6 and A7 of the SSB sequence number in the PBCH, and the sequence number of the actual offset transmission position in the alternative offset transmission positions occupies a remaining one reserved bit in the three reserved bits A5, A6 and A7 and the lower three bits in the DMRS sequence; and
    when the maximum number of SSBs in a transmission unit is 8, the sequence number of the SSB occupies the three reserved bits A5, A6 and A7 of the SSB sequence number in the PBCH, and the sequence number of the actual offset transmission position in the alternative offset transmission positions occupies the lower three bits in the DMRS sequence or also occupies two reserved bits in remaining minimum system information (RMSI) or two reserved bits in the SSB transmitted in a frequency division multiplexing mode (SSB-FDM).

11. The method of claim 1, wherein the actual sending position indication information occupies eight bits.

12. A method for transmitting synchronization indication information, the method being applied to user equipment and comprising:
    receiving a synchronization signal and physical broadcast channel block (SSB), and actual sending position indication information transmitted through a physical broadcast channel (PBCH); and performing synchronization processing according to the actual sending position indication information, wherein the actual sending position indication information is generated according to an actual offset transmission position in alternative offset transmission positions; and when a first offset transmission position of the SSB in the alternative offset transmission positions is configured to be unfixed, the actual sending position indication information comprises a sequence number of the SSB and a sequence number of the actual offset transmission position in the alternative offset transmission positions.

13. A base station, comprising:

a processor; and a memory storing instructions executable by the processor, wherein the processor is configured to:

determine, in alternative offset transmission positions, an actual offset transmission position of a synchronization signal and physical broadcast channel block (SSB) to be transmitted;

generate actual sending position indication information according to the actual offset transmission position; and transmit the SSB at the actual offset transmission position and transmit the actual sending position indication information through a physical broadcast channel (PBCH), wherein, when a first offset transmission position of the SSB in the alternative offset transmission positions is configured to be unfixed, the actual sending position indication information comprises a sequence number of the SSB and a sequence number of the actual offset transmission position in the alternative offset transmission positions.

14. The base station of claim 13, wherein, when the first offset transmission position of the SSB in the alternative offset transmission positions is configured to be fixed, the actual sending position indication information comprises a slot block sequence number.

15. The base station of claim 14, wherein the slot block sequence number occupies two remaining information bits in the PBCH.

16. The base station of claim 15, wherein, when a maximum number of SSBs in a transmission unit is 4 or 8, the slot block sequence number occupies two reserved bits A6 and A7 of an SSB sequence number in the PBCH.

17. The base station of claim 13, wherein the sequence number of the actual offset transmission position in the alternative offset transmission positions is determined by one of:

jointly numbering a system transmission position and the alternative offset transmission positions;

sequentially numbering the alternative offset transmission positions; or including, in the sequence number of the actual offset transmission position, a slot block sequence number and a position number in a slot block.

18. The base station of claim 13, wherein the sequence number of the SSB and the sequence number of the actual offset transmission position in the alternative offset transmission positions occupy six remaining information bits that are provided by a PBCH and a demodulation reference signal (DMRS) sequence.

* * * * *